United States Patent

[11] 3,532,025

| [72] | Inventors | Ernst J. Hunkeler<br>Fairport;<br>Charles B. King; Ralph E. Klubertanz;<br>Ralph M. Webster, Rochester, NY |
|---|---|---|
| [21] | Appl. No. | 764,214 |
| [22] | Filed | Oct. 1, 1968 |
| [45] | Patented | Oct. 6, 1970 |
| [73] | Assignee | The Gleason Works<br>Rochester, New York<br>a corporation of New York |

[54] RATIO-CHANGE AND SETOVER MECHANISM IN BEVEL GEAR MAKING MACHINES
20 Claims, 13 Drawing Figs.

[52] U.S. Cl. .................................................. 90/5
[51] Int. Cl. .................................................. B23f 9/10
[50] Field of Search .......................................... 90/5, 9.4, 6, 3; 51/95

[56] References Cited
UNITED STATES PATENTS

| 2,342,232 | 2/1944 | Wildhaber.............. | 90/5 |
| 2,725,792 | 12/1955 | Wildhaber.............. | 90/5 |
| 2,947,223 | 8/1960 | Carlsen.................. | 90/5 |

Primary Examiner—Gil Weidenfeld
Attorneys—Cushman, Darby and Cushman and Morton A. Polster ABSTRACT: A method and apparatus for effecting control of tooth contours and shapes in bevel gear making machines, as in an up and down roll roughing on such machines, wherein opposite sides of tapering tooth slots are produced by the respective opposite directions of roll. Included are a combination of relative cradle to work setovers to place the work and cutter in different relative positions for each direction of rolling generation, as well as ratio-of-roll differences for each direction. Such relative setovers are axially of the cradle as well as in the direction of hypoid offset, and rotationally about the respective cradle and work axes.

FIG. 1.

INVENTORS
ERNST J. HUNKELER
CHARLES B. KING
RALPH E. KLUBERTANZ
RALPH M. WEBSTER
BY
Cushman Darby & Cushman
ATTORNEYS

FIG.3.

INVENTORS
ERNST J. HUNKELER
CHARLES B. KING
RALPH E. KLUBERTANZ
RALPH M. WEBSTER
BY Cushman, Darby & Cushman
ATTORNEYS

FIG. 6.

INVENTORS
ERNST J. HUNKELER
CHARLES B. KING
RALPH E. KLUBERTANZ
RALPH M. WEBSTER
BY
Cushman, Darby & Cushman
ATTORNEYS

INVENTORS
ERNST J. HUNKELER
CHARLES B. KING
RALPH E. KLUBERTANZ
RALPH M. WEBSTER

Cushman, Darby & Cushman
ATTORNEYS

3,532,025

RATIO-CHANGE AND SET-OVER MECHANISM IN BEVEL GEAR MAKING MACHINES

BACKGROUND AND OBJECTS

The present invention relates to machines and methods for making bevel gears, and in particular, to controlling movements of the cradle and work for cutting tapered teeth of spiral bevel and hypoid gears.

The present invention is part of an overall, general development of the Gleason Works which includes several inventions besides that disclosed and claimed herein. This development includes other inventions such as a novel structural orientation of cradle, workhead assembly and associated structures, by themselves, and in combination with novel control means for the generating train, novel cradle housing and cradle assembly, a novel ratio control or ratio change mechanism, a novel workhead assembly, novel means for conveying gears or gear blanks to the cutting stations and transferring them between cutting stations with novel means for automatic stock division in going from one station to the other, a novel control means for controlling the operation of the work loading and unloading and automatic stock division mechanisms, a novel chamfering means designed to remove burrs, etc. from the roughed gears, novel cutter truing techniques and structures, and other novel structures and techniques, all of which are covered in a series of 11 U.S. Pat. applications. Ser. Nos. 764,212 —764,222 consecutively, filed of even date herewith, and the disclosures of which are all incorporated herein by reference.

While the present development relates especially to the production of bevel pinion gears for the automotive industry, for example, spiral bevel or hypoid gears, it will be apparent to those skilled in the art that features of the development may be used in machines for making other types of gears, and for industries other than the automotive industry.

As will be understood, in roughing machines embodying the present development, there is provision for doing rough cutting of the tooth slot during both directions of roll wherein a slightly different ratio of roll between cradle and work is utilized in each of the two roll directions. Indexing will be effected during a short pause at the end of the roll at the completion of a tooth cutting cycle.

The purpose of changing the ratio of roll during the two rolls in roughing is to produce in a single operation a tapering tooth slot in the rough generated pinion, as will be understood. The tapering tooth slot is characteristic of virtually all finish cut pinions in which the two sides of the tooth are finish cut in separate operations employing different machine setups and different cutters. It will be appreciated that by more closely matching the rough tooth contour to the finished tooth contour, it will be possible to minimize required finishing stock and thereby improve finishing times, tooth surface finish, and finishing cutter life.

Thus an important object of the present invention is to provide novel means for effecting a difference in the ratio of roll between cradle and work in each of the two roll directions. In the illustrative embodiment of the invention, this means will be driven by the same power source as the generating train; but will not be directly connected to the generating train to be driven thereby. Thus, this means will be utilized in combination with the generating train comprising fixed ratio of roll change gears whereby during one direction of roll the ratio of roll between cradle and work will be determined by the ratio of roll change gears while during the other direction of roll the ratio change means will be operative to change the ratio of roll between cradle and work.

A further object of the invention is to provide novel ratio change mechanism of a more simplified design and capable of more efficient operation, in combination with a conventional generating gear train, and further in combination with a novel control arrangement for the power source for the generating train.

Additionally, it is an object of the present invention to provide novel means for effecting an abrupt relative rotational setover between the cradle and work at both ends of the roll. In the illustrative embodiment of this feature of the invention, this is effected by the provision of novel means associated with the ratio change means, referred to above, and normally inactive but designed to operate when activated in such fashion that it overrides or renders inactive the ratio change mechanism and operates itself to effect an abrupt rotational movement of the cradle through a connection with the cradle worm.

These novel structures, arrangements and techniques of the present invention for effecting ratio change and abrupt relative rotational setover constitute improvements over the structures and techniques disclosed in the U.S. Pats. Nos. 2,342,232 and 2,725,792.

It is a further object of the present invention to provide novel structure for effecting a hypoid offset setover between cradle and work, at the end of the roll, to approximate more closely the finished tooth contours. This hypoid offset setover takes place in the roughing operations to provide a roughed gear which may be finish cut more efficiently, inexpensively and in less time. In the illustrative embodiment of the invention, this hypoid offset setover is effected through a movement of the cradle housing carrying the cradle and in a direction perpendicular to the axis of cradle rotation. This constitutes an improvement over the structure disclosed in U.S. Pats. Nos. 2,342,232 and 3,288,031.

It is still a further object of the present invention to provide novel means for effecting a relative setover of cradle to work in the direction of the cradle axis, and at each end of the roll. This setover will be primarily a compensation movement to produce a better matching of tooth depths obtained on the two sides of the rough cut tooth slot. In the illustrative embodiment of the invention, this setover is effected by a movement of the cradle itself and along its own axis.

An additional object is to provide a novel bevel gear-making machine and method providing for a unique combination of adjustable setovers between the cradle and work so that spiral bevel and hypoid gears having tapered tooth slots may be rough cut in a more efficient and advantageous manner, especially so as to more closely approximate the desired finished tooth contour. A related object is to utilize such adjustable setovers in combination with the novel ratio change mechanism of the invention.

Further objects reside in the provision of novel structures, combinations, methods and techniques designed to be used primarily in roughing operations in bevel gear making machines to facilitate finishing operations and wherein the rough cutting operations can be carried out more effectively and efficiently so that the rough cut gears will more closely approximate the desired finished or final tooth shapes.

Further objects and advantages of the invention will be in part obvious and in part pointed out hereinafter.

The novel features of the invention may best be made clear from the following description and accompanying drawings in which.

Figure 1:
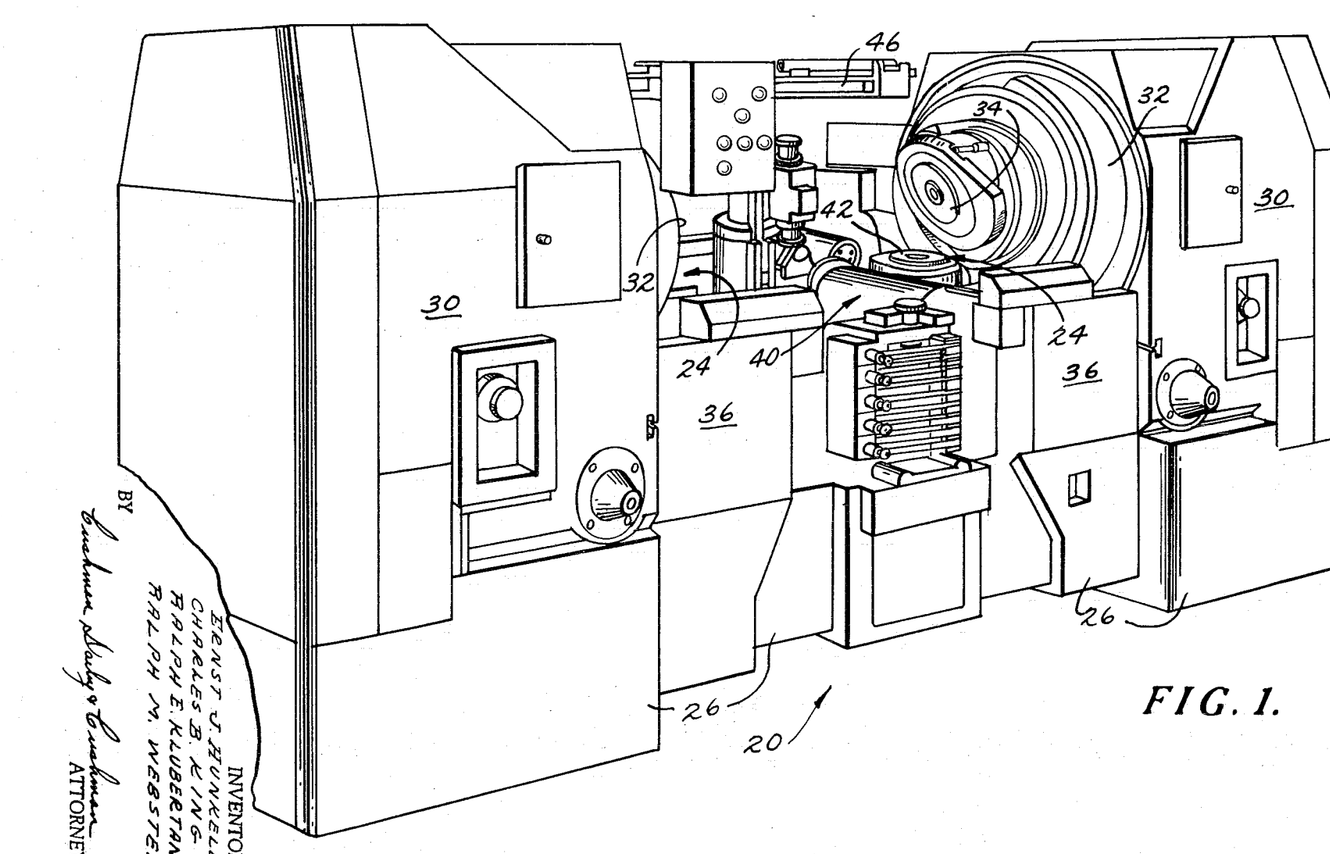
FIG. 1 is a perspective view of a machine with two cutting stations constituting a double machine illustrative of the present development referred to above.

Referring now to the drawings, FIG. 1 illustrates a double gear cutting machine 20 illustrative of an automatic pinion machine of the present development. This machine is a double finishing machine wherein each of the cutting stations does a finishing operation. However, it will be understood that a double roughing machine embodying this development may have a similar external appearance and the same basic design characteristics but with certain structural modifications adapting it for roughing rather than finishing, as will be understood to those skilled in the art, and as will be apparent from the series of applications, referred to above, filed contemporaneously herewith. As disclosed in the copending application Ser. No. 764,212, filed Oct. 1, 1968, the double machine includes two cutting stations 24 mounted on a frame 26, and each cutting station includes a cradle housing 30 containing the cradle 32 and tool holder 34 and mounted for adjustable movement on the base frame. The tool holder 34 is mounted for rotation within the cradle 32 and about a generally horizontal axis which may be adjusted within a certain range or ranges of positions as will be understood. The tool holder is designed to mount a rotary face mill cutter, and the rotary tool holder, face mill cutter and adjustable means in the cradle for adjusting the position and angle of the face mill cutter and rotary tool holder may be conventional as disclosed, for example, in the U.S. Pat. No. 2,667,818.

The machine 20 includes upstanding flanges or side walls 36 suitably mounted on the frame and extending upwardly therefrom, as shown in FIG. 1. A work-head assembly 40 is mounted between these side wall members and includes a rotatable work holder 42 mounted therein and designed to receive the work that is to be cut so that the work is rotatable about a vertical or generally vertical axis, as is disclosed in the copending application Ser. No. 764,221, filed Oct. 1, 1968.

As indicated in the copending application Ser. No. 764,212, filed Oct. 1, 1968, the present development contemplates that a single machine having a single cutting station may be provided, or a double machine may be provided, or two double machines may be provided, all involving the principles and novel features of the overall development as will be evident. The novel structures of the present invention, including the novel control means for the generating train, and related structures, will now be described with reference to a generating train designed to be utilized with a single cutting station or two cutting stations in a double machine of the type illustrated in FIG. 1 and disclosed in the copending application Ser. No. 764,212, filed Oct. 1, 1968.

THE DRIVING ARRANGEMENT

It will be understood that in generation of bevel gears, such as spiral bevel or hypoid gears, there commonly are two basic elements, the cradle and the work spindle, both of these being located in a certain spaced relationship with one another and rotating in a predetermined timed relationship on their respective axes. Conventionally, the cradle carries a rotating, multibladed face mill cutter (not shown) whose axis is in adjustable but stationary position relative to the cradle, offset from and generally inclined to the axis of the cradle on which it is mounted. The cradle and cutter mounted thereupon represent the imaginary "generating gear," as is understood, and the rotating cutter blade edges represent a tooth of this imaginary "generating gear." The work spindle carries the work being cut; the cradle carrying the cutter rotates about the cradle axis in timed relation to the rotation of the work spindle with rotating cutter in engagement with the work. Thus the imaginary "generating gear" is said to roll with the work piece.

The roll proceeds sufficiently to complete the generation of one tooth slot (or in some cutting operations, one side of one previously roughed tooth slot), whereupon there is a withdrawal so that the cradle with its cutter and the work are relatively separated one from the other in the direction of the cradle axis. The rolling motion of both cradle and work spindle is reversed during which time an increment of motion is added to the work spindle such as to advance (index) the work relative to the cradle by one pitch. At the completion of the reversal of roll, called the return roll, relative cradle axial movement between cradle and work again occurs to bring the two into cutting position, whereupon a cycle is repeated to cut the following tooth. It will be understood that, if desired for certain cutting operations, a cutting action could be provided on the return roll, after which the cutter and work will be relatively withdrawn, and the work indexed for the next tooth cutting cycle.

THE GENERATING TRAIN

The generating train of the machine, as will be understood, is the complete connection between the cradle and work spindle for controlling the relative generating rotation of these two members. The illustrative embodiment of the generating train shown in FIGS. 2 and 3 will now be traced. A worm gear 52 is fixed rotationally to the cradle 32, and this gear is engaged by a worm 54 connected to a telescoping shaft 56 on which is mounted a change gear 58. This is the point in the train where there is introduced a set of four change gears, a selection of which governs the ratio of generating roll between the cradle and work. Continuing through this latter set of change gears 60, 62, 64 through shaft 66, there is a connection to a suitable index differential gearing 68. Except during the indexing interval, which will be referred to again hereinbelow, the index differential 68 can be regarded as a simple train of gearing with gear 70 meshing with gear 72 which is rigidly connected to gear 74 meshing with a gear therebelow rigidly connected to gear 76 which in turn meshes with gear 78, as shown. Gear 78 is rigidly connected to or integral with bevel gear 80, in turn meshing with bevel gear 82 connected to shaft 84.

Figure 2:
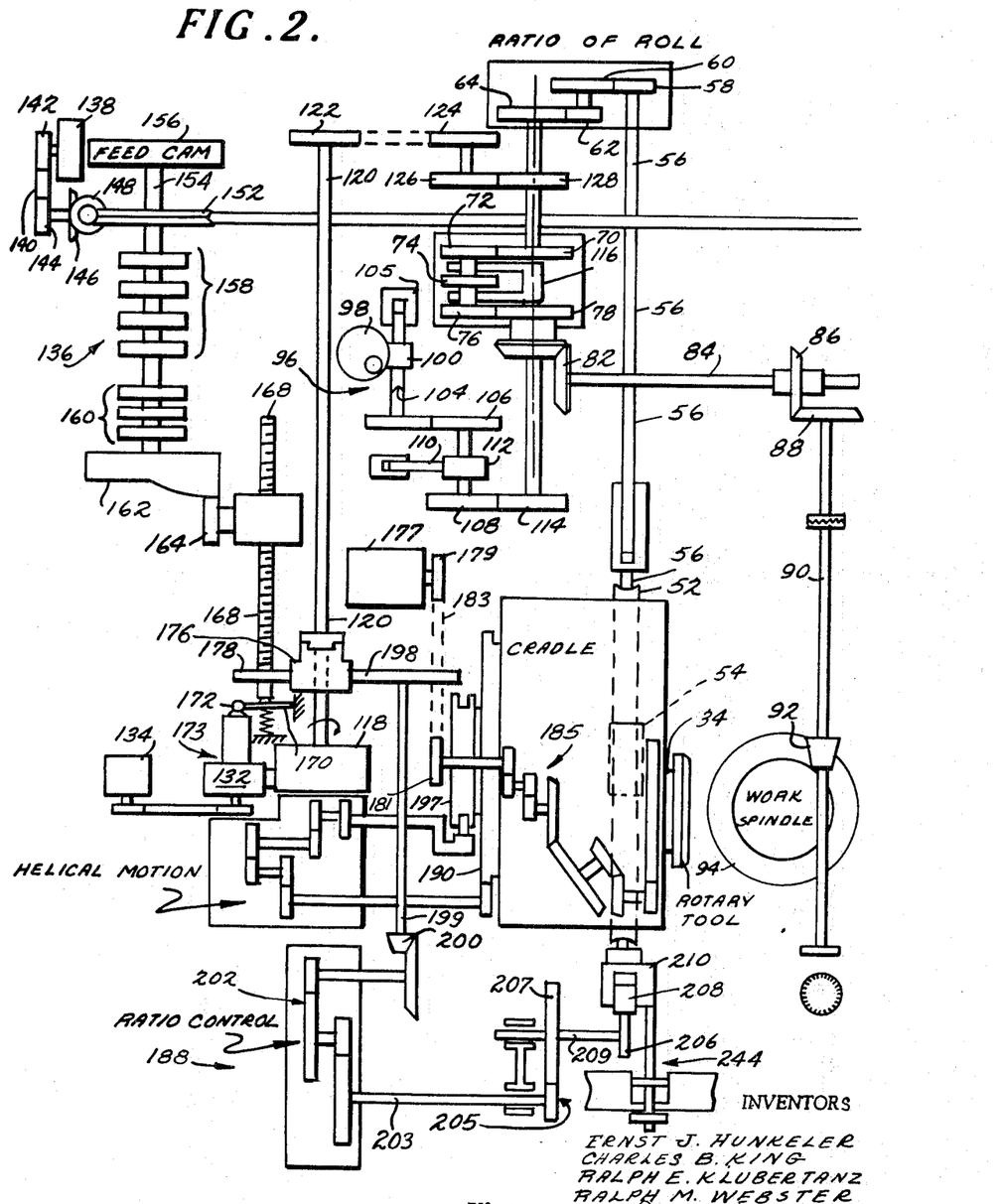
FIG. 2 is a somewhat schematic and diagrammatic view of the generating train, control means therefor, cutter drive, and ratio change or ratio control mechanism embodying the invention.
Figure 3:
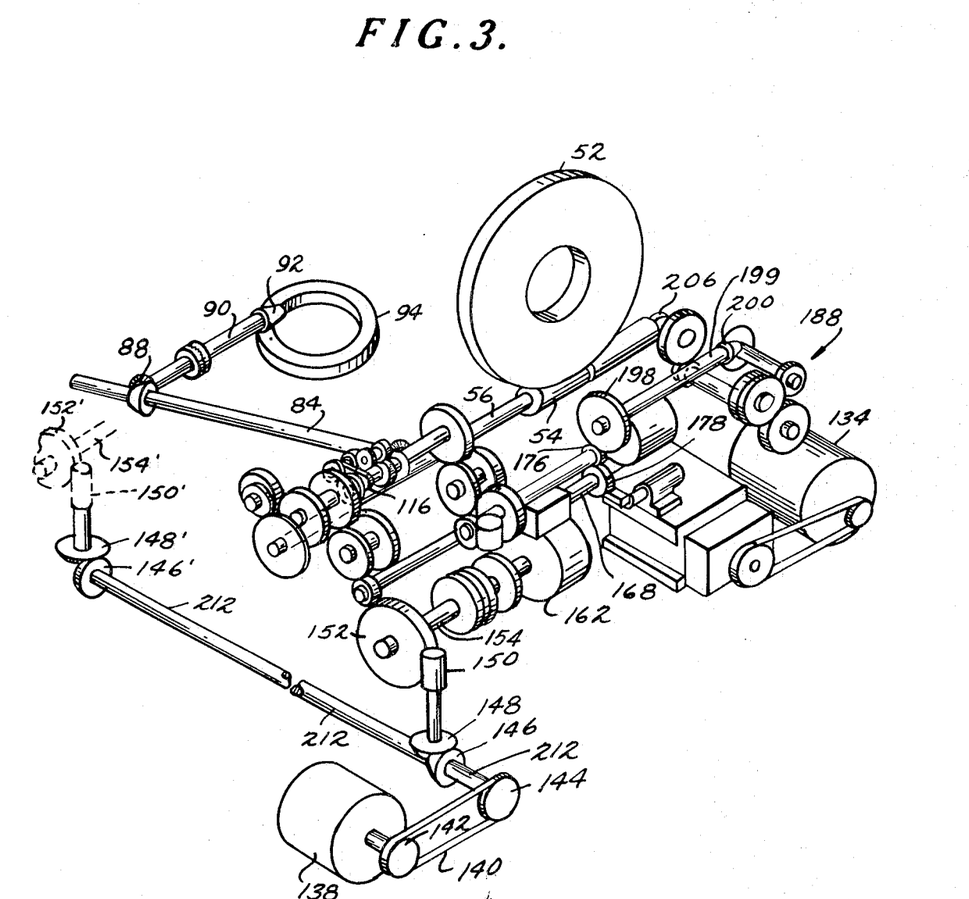
FIG. 3 is an isometric view of the structure shown in FIG. 2.

Shaft 84 is keyed for rotation to another bevel gear 86 engaging with a mating gear 88 fastened to a shaft 90 which is connected for rotation to a pinion 92 of a hypoid pair. The meshing hypoid gear 94 is rigidly connected to the work spindle. As will be understood, the work spindle is connected for rotation in the workhead assembly 40. This completes the trace of the generating train, that is, the gearing which links and controls the relative rotational motion of cradle and work during the generating rolls. It will be understood that this generating train will be capable of being rotated in either direction, for the forward and return rolls.

THE INDEXING MECHANISM

A suitable indexing mechanism 96 will be provided, and in this connection, reference is made to U.S. Pat. Nos. 3,229,552, and 3,283,660, the disclosure of which is incorporated herein by reference. The teachings of those patents indicate suitable indexing mechanisms that may be utilized in part in connection with the generating train, in the present invention. In an indexing step, the cradle 32 may be considered as fixed against rotation, and likewise cradle gear 52, worm 54 and related elements of the generating train, as will be evident. In the operation of the index 96, an index rack 98 will be moved in a direction perpendicular to the plane of the diagram in FIG. 5 and through a fixed distance by a suitable hydraulic piston (not shown). The rack 98 engages a pinion 100 which is made to turn exactly one revolution as a result of the controlled distance of rack travel. Pinion 100 drives a gear 102 through an axially engageable and disengageable one tooth clutch 104. During the forward or indexing stroke of the rack, clutch 104 is held in engagement by hydraulic pressure in cylinder 105, as will be understood. One turn of gear 102 produces a corresponding single turn of mating gear 106, which produces one turn of the coaxial and connected change gear 108. During the indexing motion of gears 106 and 108, a locking pawl 110 is made to disengage from a notch in a locking disk 112 connected to and co-rotatable with the gears 106 and 108. At the completion of the one turn, the locking pawl is made to reengage disk 112.

The change gear ratio 108, 114 is so chosen that an appropriate rotational increment is produced in the gear 114, producing in turn the identical increment in the connected differential spider 116. Spider 116 carries the differential pinions around the stationary gear 70. The action of the differential is such as to produce a turning of gear 78 relative to gear 70, equal to exactly twice the turning increment of the spider 116. The appropriate rotational increment in gear 114, controlled by the index change gear selection, must be such that the amount of turning of differential gear 78 relative to differential gear 70 will produce, by way of generating train elements 78 through 94, an increment of work spindle turning relative to the fixed cradle equal to one pitch of the work.

It will be recalled that for the purpose of explaining the function of the indexing mechanism, the cradle was considered as fixed rotationally. In actual operation, however, the indexing can be made to occur while the cradle is turning as, for example, during the noncutting portion or return roll of the cycle. The increment of index rotation produced in the work relative to the cradle is the same.

At the completion of one indexing step, hydraulic pressure in cylinder 105 will be released permitting disengagement of clutch 104 and the rack 98 and pinion 100 will be returned to their original position before the clutch is re-engaged.

THE DRIVE FOR THE GENERATING TRAIN

Figure 5:
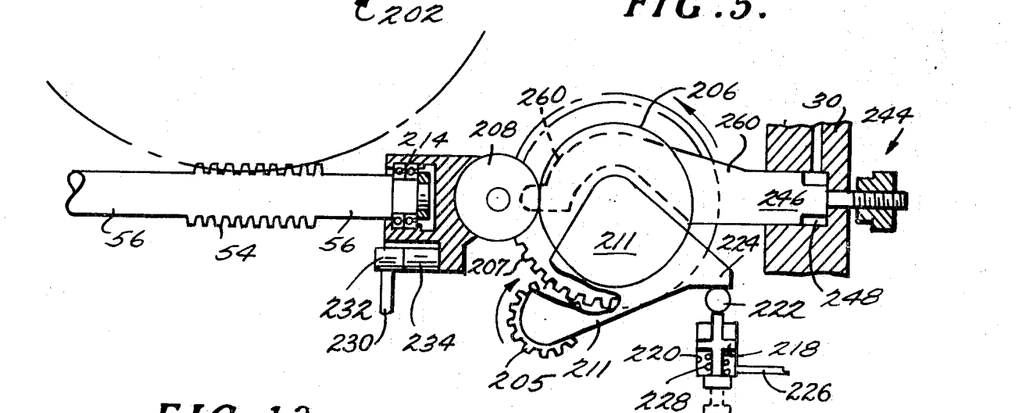
FIG. 5 is an elevational view of the structure as shown in FIG. 4.
Figure 6:
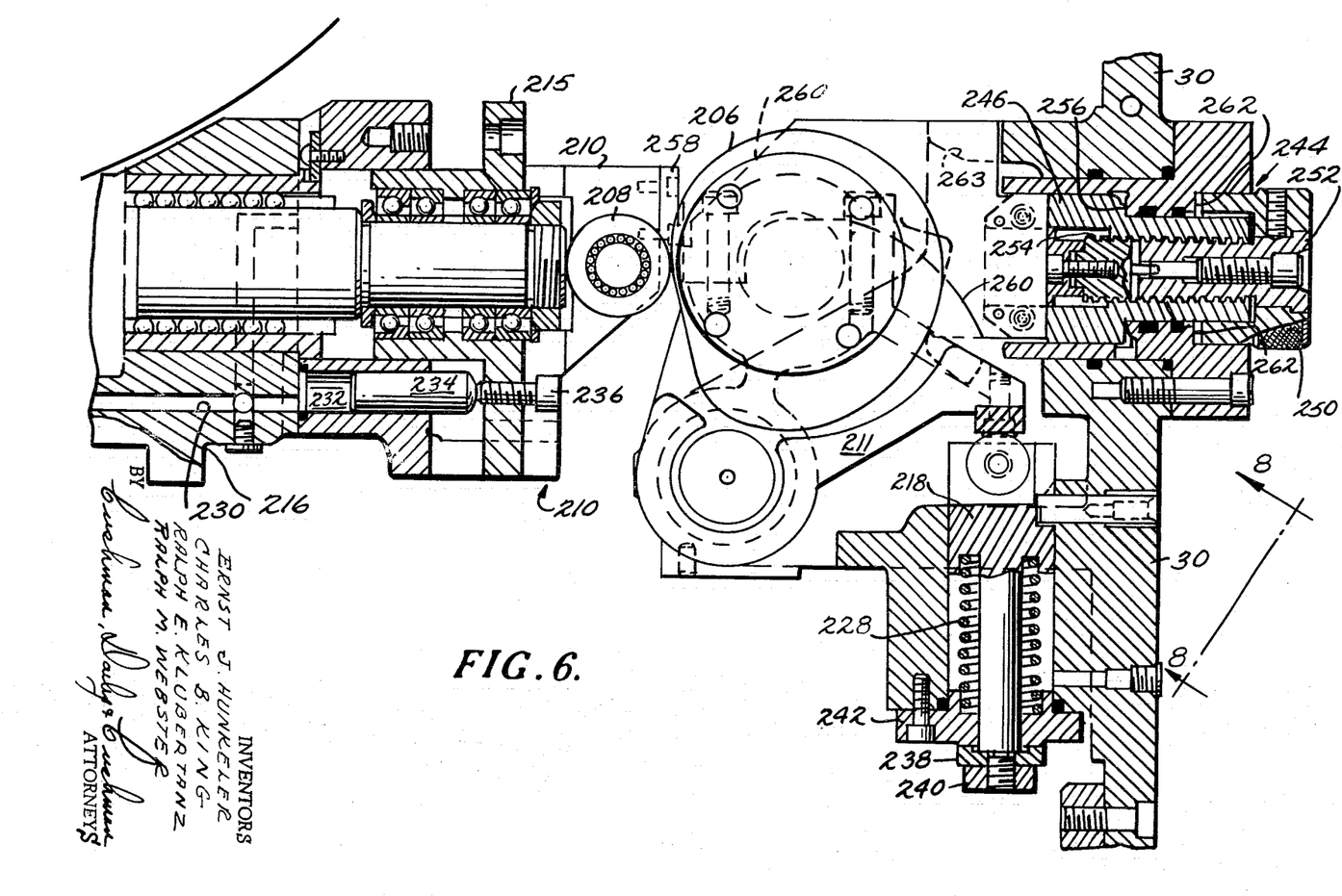
FIG. 6 is an enlarged elevational view corresponding to FIG. 5 and showing more of the structural details in the illustrative embodiment.

As shown in FIGS. 5 and 6, the drive for the generating train includes a reversible hydraulic motor 118, driving through shaft 120 and roll change gears 122, 124 and fixed gearing 126, 128, the latter gear being rigidly attached to shaft 66 in the generating train. A controllable displacement, hydraulic pump 132 is shown as being connected to the hydraulic motor 118 for controlled and reversible driving actuation thereof in conventional manner. The pump 132, in turn, is driven by a motor 134, which in the illustrative embodiment is a constant speed electric motor. The electric motor 134, hydraulic pump 132, and hydraulic motor 118 and the various driving connections therefore may all be of conventional design.

THE CUTTER DRIVE

The cutting tool, tool holder 34, and the cutter drive train are shown in FIG. 2 as driven by a separate power source, for example, an electric motor 177, through speed change pulleys 179, 181 and belt 183, and a train of gearing 185 within the cradle. This gearing may be of conventional design as disclosed, for example, in U.S. Pats. Nos. 2,667,818 and 3,288,031.

CONTROL SYSTEM FOR THE DRIVE TRAIN

The present invention contemplates a novel control system for the drive train in combination with the novel structural orientation of the cradle housing, cradle, tool holder and workhead assembly, as referred to above. The control system, per se, is more fully disclosed and claimed in the copending application Ser. No. 764,213, filed Oct. 1, 1968.

The illustrative embodiment of the control system, as best seen in FIGS. 2 and 3, includes a servo-mechanism 136, comprising a variable speed d.c. motor 138 driving through belt 140 and pulleys 142, 144, and through right angle gearing 146, 148 to a worm 150 which in turn is drivingly engaged to a worm wheel 152. The worm wheel is 152 is fixed to and rotates main cam shaft 154 which is mounted for rotation suitably in a feed cam bracket (not shown) rigidly attached to the machine frame. The feed cam shaft 154 carries the feed cam 156, various hydraulic 158 and electrical 160 trip cams (for various purposes, such as producing appropriate timing for such functions as hydraulic pressure and release to the indexing mechanism, ratio control and various setovers as will be understood). A rise end cam, called a roll cam 162, is also driven by the cam shaft 154. The variable speed motor 138 will be adjusted to regulate the cycle time of the entire machine. In the present embodiment of the invention, one turn of the main cam shaft 154 will produce one tooth cutting cycle.

A roll cam follower roller 164 is mounted on a nut 166 of a nut and screw 168 assembly, constituting a differential connection between the cam shaft 154 and the generating train, as will be apparent. The nut will be constrained against rotation but is free to translate or move axially. The screw 168 is free to translate axially and to rotate within the nonrotating nut 166, and the lower end of the screw, as shown in the drawing, bears on or against a pivoted lever 170, the free end 172 of which is arranged to actuate a hydraulic control valve system 173, of conventional design, and which includes a wobble plate valve (not shown). The wobble plate valve is designed to govern the direction and flow rate of the discharge of the pump to the hydraulic motor, and this establishes the direction and rate of motor rotation, as is understood.

A compression spring 174 is shown continuously urging the actuator 170 and screw 168 upwardly, as shown in FIG. 2, so as to urge the follower 164 into engagement with the roll cam 162.

When the cam 162 rotates from the position shown in FIG. 2, the follower 164, nut 166, screw 168 and actuator 170 will tend to move upward, as viewed in FIG. 2, as urged by the spring 174.

This movement will result in a valve movement permitting the pump to discharge fluid (for example, oil) at a certain rate and such as to rotate the motor 118 in the direction shown by the arrow. Fixed for rotation with the motor output shaft 120 is a gear 176 which is engaged to gear 178 fixed for rotation with screw 168. Rotation of the motor resulting from movement of the pump control valve regulating flow of the driving fluid to the motor will thus effect rotation of the screw 168 through the gears 176, 178, such that the screw 178 will thread itself downward within the nut 166 and tend to restore the lever 170 and control valve 173 to their original or neutral position. The lever and control valve will be restored to that neutral position unless further falling of the cam path, permitting further upward movement of the nut 166, results in a command for continuous discharge from the pump 132 to the motor 118. The pump 132 and motor 118 will both be of the positive displacement type, in the illustrative embodiment, and thus it will be seen that a given rise or fall of the cam will produce a corresponding fixed number of turns of the motor 118, and the established rise of the cam 162 will produce a fixed number of turns each way of the shaft 120 per tooth cutting cycle.

Selection of the appropriate roll change gears 122 and 124 produces from the fixed number of turns of the shaft 120 a desired angle of turning in the work spindle, as required to fully generate one tooth contour. Selection of the ratio of roll change gears 58, 60, 62 and 64 in the generating train will produce the proper proportionate angle of cradle turning, as will be apparent. Thus, by suitable choice of these roll change gears and ratio of roll change gears the desired amount of roll for the work spindle and cradle can be predetermined, for example, depending upon the requirements of a particular cutting operation and cycle. However, the present development also contemplates a separate and novel means for effecting a change in this ratio of roll between the cradle and work spindle during operation so as to produce a different ratio of roll in one direction of roll than in the other direction of roll, as may be desired for certain cutting operations, for example, in the generation of spiral or hypoid pinion gears. This means for changing the ratio of roll, separate from the ratio of roll change gears mentioned above, is a principal part of this claimed invention and will be fully described hereinbelow.

The feed cam 156, operating from the main cam shaft 154 for cycle control, preferably is arranged to actuate the cradle 32 axially into and out of generating position with the work, and this will take place once per cutting cycle, as will be understood. The structure for effecting this axial movement of the cradle is disclosed and claimed in the copending application Ser. No. 764,222, filed Oct. 1, 1968.

HELICAL MOTION MECHANISM

The helical motion mechanism 186 is shown in FIG. 2 for convenience to indicate its location in the machine when used in certain finishing operations, as disclosed in copending application Ser. No. 764,222, filed Oct. 1, 1968; however, it will not be installed in the illustrative embodiment of a roughing machine, described herein, as will be understood.

RATIO-CHANGE MECHANISM AND ROTATIONAL SETOVER

The novel structures and procedures involved in the ratio-change mechanism and cradle rotational setover in the illustrative embodiment of the invention will now be described with reference being made to FIGS. 2, 3, 4, 5, 6, 7 and 8. It is contemplated that the ratio-of-roll between cradle and work will be determined for one direction of roll by the ratio-of-roll change gears 58, 60, 62 and 64, as shown in the drive diagrams in FIGS. 2 and 3. For this direction of roll, the ratio-change mechanism 188 will not have any effect on the roll, as will be apparent as the description proceeds. For the opposite direction of roll, however, the ratio-change mechanism will have an effect on the roll, and as will be understood as the description proceeds, it imparts an axial movement in a particular direction to the cradle drive worm 54 which will either add to or subtract from the rotational motion of the worm gear 52 affixed to the cradle and caused to rotate through the generating train gearing and shaft 56 to the cradle worm 54.

Referring now to FIGS. 2 and 3, it will be seen that the ratio control or ratio-change mechanism includes a gear 198 driven by the gear 176 on the shaft 120 of the generating train. Gear 198 is connected through shaft 199 to right angle gearing 200 and then through a train of gears 202 to a shaft 203. Shaft 203 includes a gear 205 at the other end thereof and in mesh with gear 207 on shaft 209. Shaft 209 includes a cam 206 drivingly affixed thereto, as indicated. All of these parts will be arranged in suitable structures in the machines, as will be understood.

Figure 4:
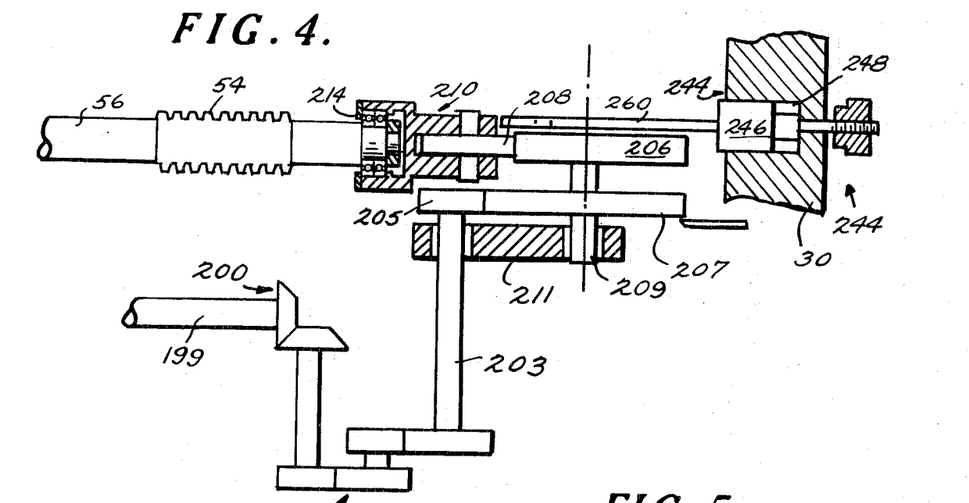
FIG. 4 is an enlarged and fragmentary schematic plan view of a portion of the ratio control means as shown in FIG. 2.

Referring now to FIGS. 2, 4 and 5, it will be seen that shafts 203, 209 are journaled in a cam bracket 211 which is suitably arranged for pivoting about the axis of shaft 203 as a fixed axis and for a purpose to be described hereinbelow. The cam 206 is designed to be selectively urged against a cam follower roller 208 mounted for rotation in follower bracket 210, as best seen in FIG. 4. An end of the shaft 56 carrying the cradle worm 54 is shown suitably journaled in thrust bearings 214 held within a retaining cartridge 215 connected to the follower bracket 210. Thus, back and forth motion of the follower 208 will control axial motion of the worm 54. In this connection, bracket 210 is shown in FIG. 6 as being slidably mounted in the worm bracket 216 of the cradle housing 30.

A piston 218 is shown in FIG. 5 arranged in a cylinder 220 and carrying a member 222 at the upper end thereof and in engagement with the free end 224 of the cam bracket 211, as shown. A fluid line 226 is shown as being connected to the cylinder 220, at the lower end thereof, for the timed introduction of fluid pressure into the cylinder to elevate the piston 218, and hold it in the position shown in FIG. 5. When this pressure is released, it will be appreciated that the piston will be urged down in the cylinder to its retracted position under the weight of the cam bracket 211, gear 207 and cam 206. But a yieldable compression spring 228 is arranged in the cylinder 220, as shown in FIG. 6 to tend to hold bracket 211 in the position shown.

As shown in FIGS. 5 and 6, the follower bracket 210 will be continuously urged to the right during cutting operations. In the illustrative embodiment shown, this is accomplished by means of fluid or hydraulic pressure in line 230 entering cylinder 232 and urging piston 234 therein to the right against the follower bracket 210 so as continuously to urge the roller or follower 208 to the right and in engagement with the cam 206. This fluid pressure will be of such magnitude as to yield to the action of the cam surface of cam 206 when the latter tends to move the follower 208 and shaft 56 to the left as viewed in FIGS. 5 and 6, as will be appreciated. Piston 234 is shown as being slidably arranged in worm bracket 216 in the cradle housing, and a plurality of these pistons and cylinders 232 may be provided engaging the follower bracket 210 at several points to provide for a more uniform distribution of pressure thereon. A screw 236 is shown carried by the follower bracket 210 and engaged by the piston 234.

As will be understood, when the cam bracket 211 is held in the position thereof shown in FIG. 5 by fluid pressure in the cylinder 220, the cam 206 will be rotating in engagement with the follower roller 208. Rotation of the cam 206 will operate in conjunction with the fluid pressure in the cylinder 232 urging the roller 208 against the cam 206, to effect axial movement of the shaft 56 carrying the worm 54, in accordance with the contour of the surface of the cam 206 so as to affect the rotation of the worm gear 52 on the cradle 32. Cam 206 will be so operative during the time it is desired to change the ratio of roll between the cradle and work from what it would otherwise be under the influence only of the ratio of roll change gears 58, 60, 62 and 64 of the generating train. However, during a roll whenever it is desired to have only these latter gears operate to determine the ratio of roll between cradle and work, the pressure in cylinder 220 will be released, and rotation of the cam 206 will not effect any movement of the worm shaft 56. Thus, the ratio change mechanism 188 will be disabled or not active during that particular roll. It is only when pressure is introduced into cylinder 220 to hold the piston 218 elevated that the ratio of change mechanism will be enabled or active to effect the desired change in the ratio of roll.

Cylinder 220 may be suitably attached to the cradle housing 30 and piston 218 is shown as having a collar 238 attached thereto by nut 240 to provide a positive stop against the cylinder cap 242, for upward piston movement.

During the roll direction in which the ratio change mechanism is operative, the axial position of the cradle worm will thus be under the control of the ratio of roll cam 206 being rotated about its axis which is held in a fixed position by the interaction of the piston 218 hydraulically forced against the positive stop 242 and the follower roller 208 hydraulically forced against the cam surface by pistons 234 acting against elements 210, 215.

The present invention also contemplates novel structures for effecting cradle rotational setover which may be used for size control, as will be understood. In the illustrative embodiment of the invention, and as seen particularly in FIGS. 4, 5, 6 and 7, this cradle rotational setover mechanism 244 preferably is designed to operate instantaneously before the roll reverses at the end of the roll direction during which the ratio change mechanism 188 is enabled or active, and before the roll reverses to the direction in which the ratio change mechanism is disabled. The structure of the cradle rotational setover means will then take control of the cradle worm axial position away from the ratio change cam 206, and will effect an abrupt change in that position, that is, in the position of the cradle worm 54, thereby producing a corresponding abrupt change in the cradle rotational position, for the purpose indicated.

As best seen in FIGS. 4, 5 and 6, there is provided a setover piston 246 actuated by hydraulic pressure in cylinder 248 and which has its axial position moved alternately to the left, in FIG. 6, for one direction of setover prior to the beginning of one cradle roll direction, and to the right prior to the beginning of the opposite direction of cradle rolling. Suitable means are provided for adjustment of the amount of travel available for the piston 246. As shown in FIG. 6, this includes a hand adjusting wheel 250 which carries threaded elements 252 and 254 screwed in the piston, and a dial 251 is also provided. The inner end of wheel 250 forms an adjustable gap with the adjacent facing shoulder of the cylinder 248. This total adjusted gap exists when the pressure in cylinder 248 is released and the piston 246 is being held in a position fully to the right against the stop 256. The force to hold the piston to the right originates with the hydraulic pressure continuously present in cylinders 232 acting through pistons 234 and bracket 210 and cartridge 215. Bracket 210 carries a stop plate 258 designed to be engaged by the left end of a stop arm 260 which is suitably directly fastened to the piston 246, as shown.

The stop arm 260 travels axially with piston 246 and both are prevented from rotation by means of the arm 260, engaging in a slot 263 in the cradle housing 30 which preferably mounts both cylinders 220 and 248, as shown.

When pressure is admitted to the cylinder 248 through some suitable fluid port, the cradle rotational setover piston 246 will be moved to the left, as viewed in FIGS. 4—6 until the inner end of wheel 250 strikes the stop surface 262. This will effect a setover of the worm 54 axially to the left, through the curved stop arm 260 and stop plate 258. Simultaneously pressure will be released from the cylinder 220 thereby disabling the ratio-change mechanism 188. For this part of the cycle, which may be either an up or a down roll as chosen, pressure will remain in the cylinder 248 and will remain exhausted from the cylinder 220.

The ratio-change cam 206 will continue to rotate, being driven by the gear 205, and the axis of the cam 206 will remain in the position shown if on a falling path of its surface, or if the cam is rotating such as to present a rising path to the follower 208, the cam bracket will merely lower against the light pressure of compression spring 228 in cylinder 220, and in either case, the rotating cam will have no effect on the axial position of the cradle worm at this time, and the pressure in cylinder 248 will prevent axial movement of worm 54 to the right.

When pressure is then readmitted to the cylinder 220 approximately simultaneously with the next reversal of cradle roll, pressure will be exhausted from the cylinder 248. This release of the pressure in the latter cylinder will permit movement to the right of the piston 246, stop arm 260 and cradle worm; however, it will be noted that such return movement of these parts may or may not take place depending, for example, on the design and adjustment of the cam 206. In other words, if a rising part of the cam is in engagement with the roller 208 at this time, return movement of the roller to the right will be prevented. Cam 206 will thus be urged by pressure in the cylinder 220 to return to or remain in the position thereof shown in FIG. 6 and established by the positive stop 242 on the cylinder cap. Rotation of the cam will reverse with the reversal of cradle roll, and the cam will reassume control of the axial positioning and axial movement of cradle worm 54, as will be understood.

Figure 7:
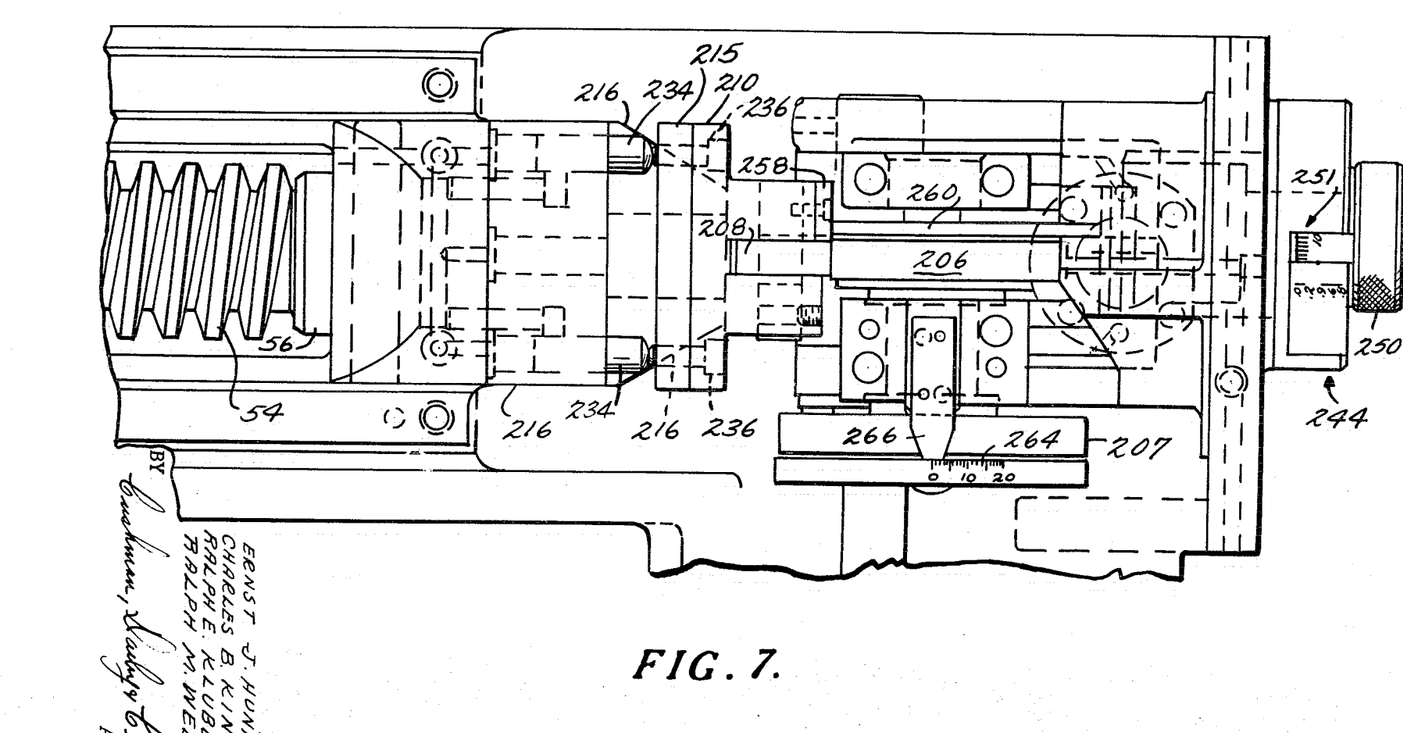
FIG. 7 is an enlarged view corresponding to FIG. 4 and showing more of the structural details in the illustrative embodiment.
Figure 8:
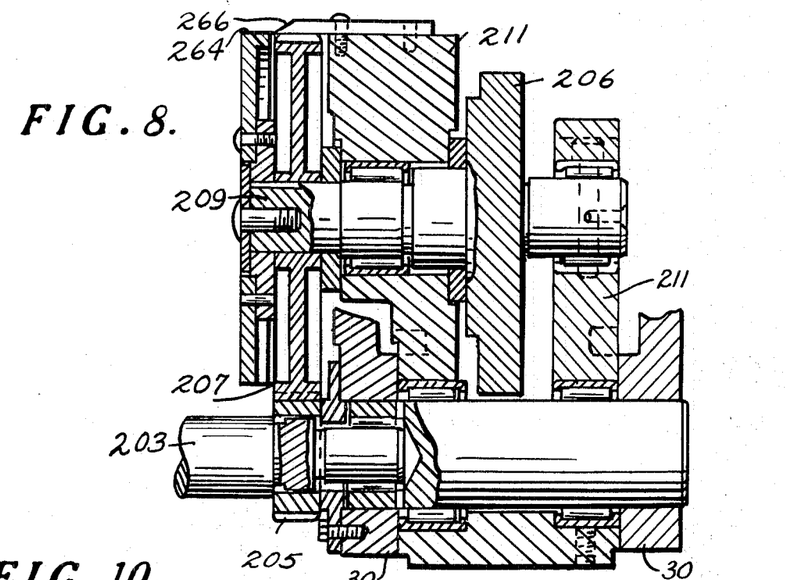
FIG. 8 is an enlarged view of the structure shown in FIG. 6 and viewed in the direction of arrows 8–8 in that figure.

A suitable dial 264 and pointer 266 may be provided, as shown in FIGS. 7 and 8, in connection with indicating and setting the position for cam 206, as will be evident.

CRADLE AXIAL SETOVER

Figures 11, 12:
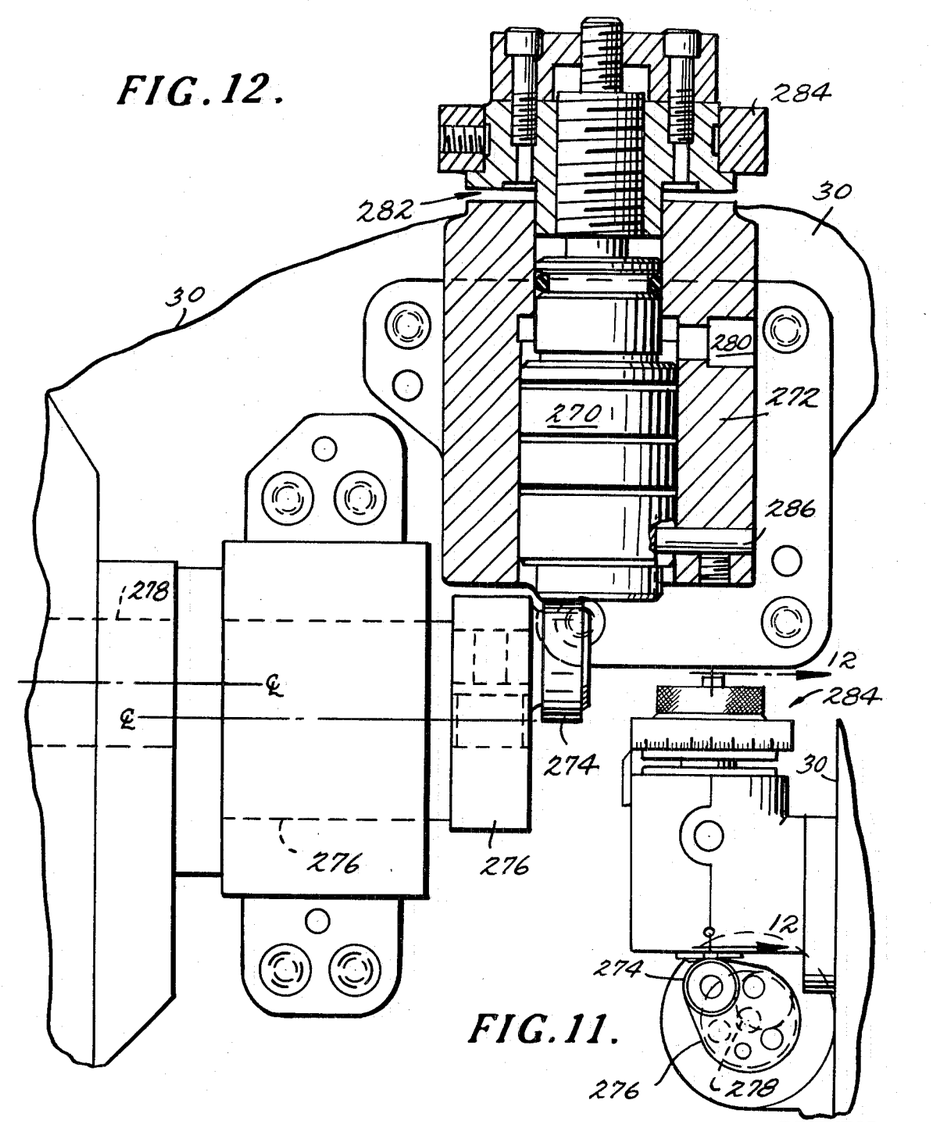
FIG. 11 is an elevational view of structure embodying the invention and designed to be utilized in the cradle axial setover mechanism in the illustrative embodiment of the invention.
FIG. 12 is an enlarged elevational view of the structure shown in FIG. 11 and partially sectioned along the line 12–12 in FIG. 11.

The illustrative embodiment of the cradle axial setover mechanism of the invention is shown in FIGS. 11 and 12. As shown, this mechanism includes an adjustable displacement hydraulic piston 270 operating in a cylinder 272 suitably mounted on the cradle housing 30 of the roughing machine and preferably directly in the corresponding position occupied by the helical motion cam and follower (not shown) of a finishing machine. The piston 270 acts directly on a roller 274 carried by a crank 276 drivingly connected to an eccentric member 278, arranged for driving or moving the cradle in a direction along its axis, as is disclosed more fully in the copending application Ser. No. 764,222 filed Oct. 1, 1968. When pressure is admitted to the cylinder 272, as through port 280, the piston 270 will be moved downwardly to rotate the crank 276 and eccentric 278 counterclockwise as viewed in FIG. 11, and this counterclockwise rotation of the crank will effect an abrupt withdrawal of the cradle axially in the cradle housing, and against pressure exerted on the cradle to keep it in an advanced position, as will be understood from the copending application just referred to. The amount of withdrawal of the cradle will be controlled by the adjustable gap 282 which limits the downward movement of the piston against the top of the cylinder, as will be evident. A suitable adjusting knob 284 may be provided at the top of the piston 270, for example, in threaded connection therewith, as shown, so that rotation of the knob will effect an increase or decrease in the size of the gap 282 to increase or decrease the stroke of the piston, thereby increasing or decreasing the amount of axial movement of the cradle caused thereby. A pin 286 is shown as arranged in the lower end of the cylinder 272 and extending into a vertical slot in the piston so as to permit rotary adjusting movements of the knob 284 while the piston is held stationary rotationally thereby.

For the return setover, pressure will be exhausted from the cylinder 272 and the crank will be rotated clockwise, as viewed in FIG. 11 (being actuated by pressure in the cradle as disclosed in the last referred to copending application) to move the piston 270 upwardly until the cradle returns or advances axially inwardly to the position controlled by a positive stop (not shown) therefor.

HYPOID OFFSET SETOVER

Figure 9:
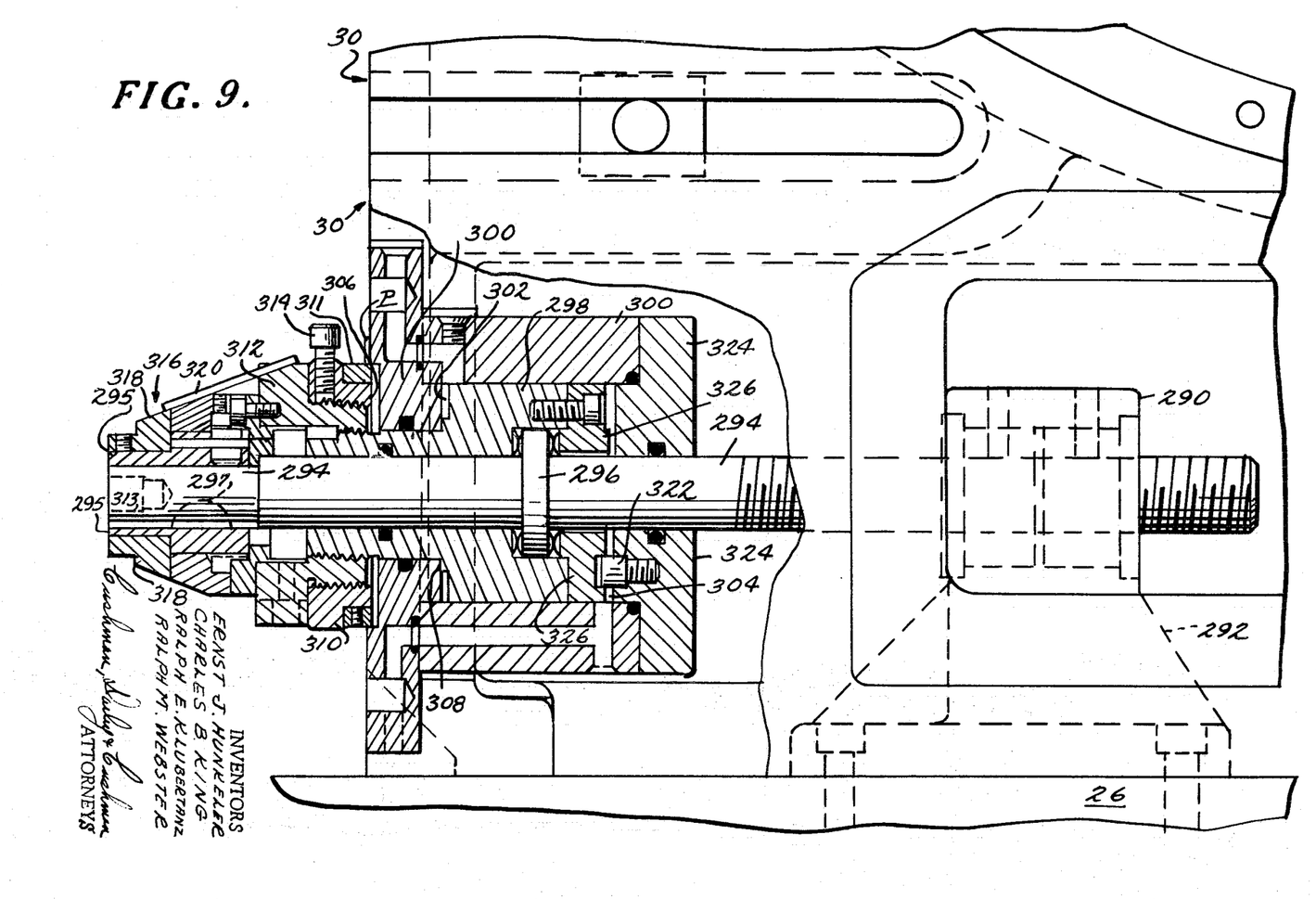
FIG. 9 is an enlarged, fragmentary and partially vertically sectioned view of a hypoid offset setover embodying the invention.
Figure 10:
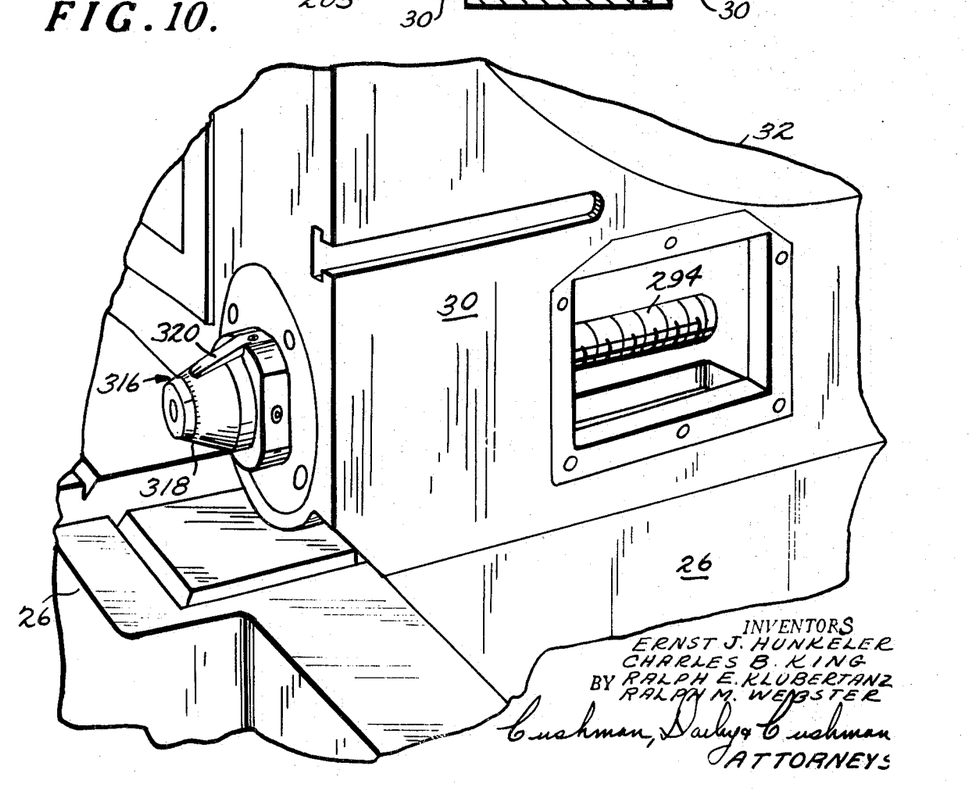
FIG. 10 is a fragmentary perspective view showing certain parts of the hypoid offset setover construction of FIG. 9.

The illustrative embodiment of the hypoid offset mechanism 288 of the invention is shown in FIGS. 9 and 10. It is contemplated that this mechanism will operate so as to provide for both a substantial offset of the cradle axis horizontally and at right angles to the work axis (also to the normal cradle axis), for example, during initial setup, and a lesser but abrupt setover to and fro from this basic position during operation. It is further contemplated that these adjusting movements of the cradle be accomplished by movement of the entire cradle housing 30 with respect to the machine frame 26. As best seen in FIG. 9, this mechanism includes an internally threaded element 290 mounted in fixed or stationary position in a bracket 292 suitably fixed to the machine frame. A threaded stem member 294 is screwed through the nut-like element 290 and is adapted to be threaded in either direction within this element. As shown, the left end of the stem 294 is provided with a collar 296 suitably journaled and held axially in a recess within a piston member 298, as shown. This piston is arranged for sliding movement within the cylinder 300 which is suitably attached in fixed position to the cradle housing 30.

Relative movements of the piston 298 and cylinder 300 are provided by the hypoid offset setover. In the action of this setover the piston will remain stationary relative to the machine frame, and with pressure reversals, for example, admitting oil under pressure alternately to the left and right cylinder ends 302 and 304 through suitable passageways, as shown, the cylinder carrying with it the entire cradle housing will be moved alternately to the left until it strikes the positive stop 306, and to the right until it strikes positive stop 308, the piston head. Suitable means may be provided for adjusting the gap or distance between these stops 306, 308, as shown. Such means includes an internally threaded calibrated adjusting nut 310 calibrated on a loose sleeve 311 and adjustably screwed onto a threaded member 312 fastened to the piston 298 in a locked position therewith, as shown. When adjustment of nut 310 is made, the locking screw 314 will be tightened, fixing the nut in this adjusted position relative to the threaded member 312. A pointer P may be provided, as shown.

For making the much larger, basic hypoid offset setting of the cradle, pressure can be admitted to one side of the cylinder, as at the right-hand end thereof, as viewed in FIG. 9, and the screw 294 will be manually rotated by suitable means so as to move axially in the stationary bracket 292 and carry with it axially the entire assembly including the piston 298, cylinder 300 and cradle housing 30.

A differential calibrated dial assembly 316 is shown as arranged on the left end of the threaded member 294, and includes a dial 318 adjustably connected to the member 294, as by set screw contact with a sleeve 295 keyed to the member 294, as indicated at 297. The dial assembly includes a pointer 320 carried by member 312. While making the larger, basic hypoid offset setting, the dial 318 will rotate with the threaded member 294 and the pointer and member 312 will not rotate, as will be evident. Suitable means may be provided for preventing rotation of the piston 298 as, for example, a pin 322 carried by the cylinder cap 324 and slidably received in a corresponding slot in the piston end member 326, as shown. The left end of the threaded member 294 is shown as including a hole or socket 313 adapted to receive a suitable tool for manually rotating the member 294, as during set up.

SETOVER CONTROLS

Figure 13:
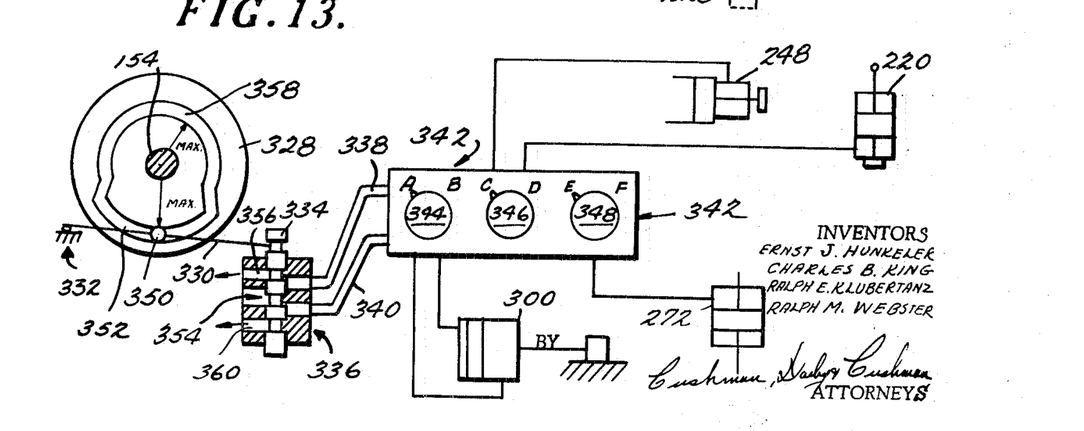
FIG. 13 is a schematic and diagrammatic view of an exemplary hydraulic control arrangement for the ratio change mechanism and various setovers, referred to above, and embodying the invention.

An exemplary arrangement of a hydraulic control system that may be utilized for the ratio-change mechanism and the related cradle rotational, cradle axial and hypoid offset setovers is shown schematically in FIG. 13, and includes a trip cam 328. The trip cam 328 preferably is one of the hydraulic cams 158 on the cam shaft 154 of the servo-mechanism 136, shown in FIG. 2. As noted hereinabove, this shaft preferably makes one revolution per tooth cutting cycle consisting of an up and a down roll and a work indexing step. The cam 328 is shown in FIG. 13 as actuating a pivoted follower lever 330, pivoted at the left end thereof at 332, and operatively connected to a multi-headed piston 334 to reciprocate the latter up and down as viewed in FIG. 13 in the pilot valve 336. Actuation of the pilot valve to either its up or down positions will admit hydraulic pressure selectively to one or the other of the two lines 338, 340 communicating with directional valve manifold 342. There are three valves 344, 346, 348 provided in this manifold, adapted to connect the lines 338, 340 with the cylinders 220, 248, 272 and 300 for the ratio-change mechanism, the relative rotational setover, the cradle axial setover, and the hypoid setover, respectively. Each of these directional valves is provided with two positions for determining the relative directions for each of the various setovers and their timing relationship with the enable and disable of the ratio-change mechanism 188. The two positions A, B of directional valve 344 are designed to communicate with the cylinder 300 of the hypoid offset setover. The two positions C, D of the directional valve 346 are adapted to be placed in fluid communication respectively with the cylinder 248 of the cradle rotational setover and cylinder 220 of the ratio-change mechanism. The position E of directional valve 348 is designed to place the fluid line 338 in communication with the cradle axial setover cylinder 272, while the position F of this valve will place fluid line 340 in communication with the cylinder 272.

It will be noted that when piston 334 is down (while follower 350 is in the slot 352 of maximum radius on trip cam 328), the inlet line 354 will be in communication with the lower line 340, and upper line 338 will be on exhaust through port 356; and when the piston is up (while follower 350 is in the slot 358 of minimum radius on the trip cam), the inlet line 354 will be in communication with the upper line 338, and lower line 340 will be on exhaust through port 360.

It will be understood that various combinations of positions and actuating sequences of valves 344, 346, 348 may be utilized, depending on the requirements of the finished gear, and the direction of roll, etc. Suitable means (not shown) may be provided for automatically actuating the valves 344, 346, 348 in desired sequence, during cutting operations, as will be understood.

OPERATION

In roughing operations utilizing the foregoing structures and techniques, it is contemplated that the roughing may be performed on a solid uncut work blank, or it may be preceded by a gashing or generating operation in a previous roughing operation, as will be understood.

As indicated, there will be cutting on both the up and down roll, and for the sake of this description, it will be assumed that the cutting operation will begin at the top of the down roll (although it will be understood that, if desired, the cutting cycle may begin with the bottom of an up roll). Thus, with cutting starting at the top of a down roll, rolling will proceed and in the illustrative embodiment of the invention, only one side (for example, the concave side) of the tooth will be finalroughed during this down roll. For the down roll, the ratio of roll between cradle and work will be controlled only by the ratio of roll gears 58, 60, 62 and 64.

When the bottom of the roll is reached, it is contemplated that three setovers take place as follows: (a) there is a rotational setover of the cradle effected through the rotational setover mechanism, including the piston 248 and stop arm 260, as described above (this is for the purpose of cutting the taper); (b) there is a hypoid offset setover of the cradle effected by the hypoid offset mechanism moving the cradle housing 30 and cradle 32 in a direction perpendicular to the work axis; (c) there is an axial setover of the cradle effected by the cradle axial setover mechanism. The purpose of the hypoid offset setover and cradle axial setover is to improve the correspondence of the roughed tooth and tooth slot contours to their finished contours. The magnitude of these three setovers (a), (b) and (c) will be determined by design requirements, for example, different design requirements may dictate using more or less of these setovers, and in an additive or subtractive way, as will be evident.

Continuing now with the description of the tooth cutting cycle, on the return or up roll, the opposite side of the tooth slot (for example, the convex side) will now be cut with the ratio of roll between cradle and work different as a result of the action of the ratio-change mechanism 188 which was moved into its enabling position. This ratio change will be accomplished in the illustrative embodiment of the invention by imparting a slow axial movement to the cradle worm during the roll, thereby extending or reducing the roll, as desired. It is contemplated that both sides of the tooth slot may be cut on the return roll, if desired.

At the completion of the uproll, the cradle will be withdrawn from the work, the work will be indexed (this indexing could be accomplished either before or at top dead center and continue for a while), then the various setovers will be reversed so as to return the cradle and work to their proper positions to begin a new cycle.

It will be noted the structures and techniques of the present invention provide for an increased production rate of roughed gears closely approximating the desired finished contours so as to facilitate finishing operations. The several setover mechanisms preferably are integrated with the ratio change mechanism 188 and servo control mechanism 136 for this purpose, as described above, and are intended to provide a smoother operation, greater efficiency and better coordination of the various desired movements, while providing novel and relatively simplified structures for this purpose in the interest of overall machine simplification.

It will thus be seen that the objects of this invention have been fully and effectively accomplished. It will be realized, however, that the foregoing specific embodiments have been shown and described only for the purpose of illustrating the principles of the invention and are subject to extensive change without departure from such principles. Therefore, this invention includes all modifications encompassed within the spirit and scope of the following claims.

We claim:

1. A gear generator having supports for a cutter and a work spindle, one of which supports has a worm wheel co-rotatable therewith, a worm for driving said wheel and connected for axial motion with a cam follower, a cam adapted to act against the follower to shift the worm axially and thereby supplement the rotation imparted to the wheel by rotation of the worm, a bracket supporting the cam for rotation and being movable to carry the cam to and from operable relation to the follower, pressure actuated means for holding the bracket in the position thereof wherein the cam is in such operable relation, and other pressure actuated means for holding the cam follower and worm against axial motion when the bracket is released by the first-mentioned pressure actuated means.

2. A generator according to claim 1 in which the bracket is pivotally supported for said movement thereof to carry the cam to and from operable relation to the follower.

3. A generator according to claim 1 having means for rotating the worm and the work spindle spindle back and forth in predetermined ratio, means for activating the first-mentioned pressure actuated means during the rotation in one direction and for activating the other pressure actuated means during the reverse rotation.

4. A gear generator having supports for a cutter and a work spindle, one of which supports has a worm wheel co-rotatable therewith, a worm for driving said wheel and connected for axial motion with a cam follower, a cam adapted to act against the follower to shift the worm axially and thereby supplement the rotation imparted to the wheel by rotation of the worm, a generating gear train for rotating said worm, a power source for said generating train, said cam being driven by said power source and outside of said generating train, a bracket supporting the cam for rotation and being movable to carry the cam to and from operable relation to the follower, and pressure actuated means for holding the bracket in the position thereof wherein the cam is in such operable relation.

5. The structure defined in claim 4 and further including pressure actuated means operatively connected to said follower and continuously urging it toward said cam.

6. The structure defined in claim 4 and further including other pressure actuated means, means for activating the first-mentioned pressure actuated means during the rotation of said wheel in one direction and for activating the other pressure actuated means during the reverse direction, and said other pressure actuated means being operatively connected to said worm to effect an abrupt axial movement thereof when activated.

7. A gear generator having a cradle mounting a tool holder, a work spindle, a reversible generating train connected to said cradle and said work spindle to rotate them and including ratio of roll gears designed to effect a predetermined ratio of roll between said cradle and said work spindle in reverse directions, a first reversible power source and first means drivingly connecting said power source to said generating train, second means driven off said first means independently from said generating train and operatively connected to rotate said cradle at predetermined times to supplement or modify the effect of rotation of said generating train of said cradle.

8. The structure defined in claim 7 wherein said second means is operative only during one direction of rotation of said generating train to vary the ratio of roll between said cradle and said work spindle while during the other direction of rotation of said generating train said ratio of roll is under the control of said ratio of roll gears.

9. The structure defined in claim 7 and further including control means for said generating train operatively connected to said first means for controlling the operation of said power source, and said control means having its own separate power source.

10. The structure defined in claim 9 wherein said control means includes a differential connection between said first means and second power source for differential operation thereby.

11. The structure define in claim 7 and further including a cradle rotational setover mechanism and means operatively connecting it to said cradle for effecting an abrupt rotational movement of said cradle independently of said second means and during a period of reversal of the direction of rotation of said generating train.

12. The structure defined in claim 11 wherein said second means includes first pressure actuated means operatively connected to rotate said cradle, and wherein said setover mechanism includes second pressure actuated means operatively connected to rotate said cradle, said first pressure actuated means being actuated during one direction of rotating of said generating train and said second pressure activated means being activated during the reverse rotation of said generating train.

13. The structure defined in claim 7 and further including a hypoid offset setover mechanism operatively connected to said cradle for effecting horizontal bodily movement of said cradle perpendicular to its axis of rotation and during periods of reversals of the direction of rotation of said generating train.

14. The structure defined in claim 13 wherein said gear generator includes a base frame and a housing for said cradle slidably supported on said base frame for movement in a direction perpendicular to the axis of rotating on said cradle and wherein said hypoid setover mechanism includes pressure actuated means operatively connected to the cradle housing at one point, and to the stationary base frame at another point whereby upon activation of said pressure actuated means the cradle housing will be moved relative to said base frame.

15. The structure defined in claim 14 wherein said hypoid setover mechanism further includes adjusting means operable independently of activation of said pressure actuated means to move the cradle housing on said base.

16. The structure defined in claim 7 and further including a cradle axial setover mechanism operatively connected to said cradle for effecting predetermined movement of said cradle in a direction along its axis, and means independent of said cradle setover mechanism for effecting cradle axial withdrawal and advance in connection with operations for indexing the work in said work spindle.

17. A gear generator having a cradle mounting a tool holder, a work spindle, a reversible generating train connected to said cradle and said work spindle to rotate them and including ratio of roll gears designed to effect a predetermined ratio of roll between said cradle and said work spindle in reverse directions, a first reversible power source and first means drivingly connecting said power source to said generating train, a plurality of setovers for said cradle operative during periods of reversal of the direction of rotation of said generating train and including a cradle rotational setover, a cradle axial setover, and a hypoid offset setover operative to move said cradle horizontally in a direction perpendicular to its axis.

18. The structure defined in claim 17 wherein second means are provided driven off said first means independently from said generating train and operatively connected to rotate said cradle at predetermined times to supplement or modify the effect of rotation of said generating train on said cradle.

19. A gear generating machine including a rotatable cradle, a rotatable work spindle, a generating gear train drivingly connected to said cradle and said work spindle to rotate them and including ratio of roll gears providing a predetermined ratio of roll between said cradle and said work spindle, a ratio change mechanism outside of said generating train and operatively connected to said cradle to rotate it at predetermined times, a common power source drivingly connected to said generating train and said ratio change mechanism, and means for preventing ratio change mechanism from having any effect on cradle rotation only during one direction of roll.

20. The method of cutting opposite sides of the tooth spaces of a longitudinally curved tooth tapered gear in a single cycle of operation in a machine including a rotatable cradle, a rotatable work spindle, a generating gear train drivingly connected to said cradle and work spindle to rotate them and including ratio of roll gears to provide a predetermined ratio of roll between said cradle and said work spindle, a ratio change mechanism outside of said generating train and operatively connected to said cradle to rotate it at predetermined times, and a common power source drivingly connected to said generating train and said ratio change mechanism, said method comprising the steps of: rotating the cradle and work spindle under the influence of the ratio of roll gears for one direction of cutting roll while said ratio change mechanism is kept from having any effect on cradle rotation; at the end of this roll abruptly setting over the cradle by abrupt limited rotation thereof; setting over the cradle by limited horizontal movement thereof in a direction perpendicular to the cradle axis; axially setting over the cradle by limited movement thereof in a direction along its axis; reversing the rotation of the cradle and work spindle to provide a cutting roll in the opposite direction; and rendering active the ratio change mechanism during this latter roll so that the ratio of roll between the cradle and work spindle will be different during this roll.